United States Patent
Ward et al.

(10) Patent No.: US 7,233,983 B2
(45) Date of Patent: Jun. 19, 2007

(54) RELIABILITY FOR INTERCONNECT FABRICS

(75) Inventors: Julie Ann Ward, Menlo Park, CA (US); Troy Alexander Shahoumian, Sunnyvale, CA (US); John Wilkes, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 341 days.

(21) Appl. No.: 10/052,682

(22) Filed: Jan. 17, 2002

(65) Prior Publication Data
US 2002/0091804 A1 Jul. 11, 2002

Related U.S. Application Data

(63) Continuation-in-part of application No. 09/707,227, filed on Nov. 6, 2000.

(51) Int. Cl.
*G06F 13/00* (2006.01)
(52) U.S. Cl. ..................................... 709/220
(58) Field of Classification Search ........ 709/238–239, 709/223–224, 473–474; 370/230, 236, 338; 714/4, 13
See application file for complete search history.

(56) References Cited

U.S. PATENT DOCUMENTS

| | | | |
|---|---|---|---|
| 4,920,487 A | 4/1990 | Baffes | |
| 5,107,489 A | 4/1992 | Brown et al. | |
| 5,113,496 A | 5/1992 | McCalley et al. | |
| 5,138,657 A | 8/1992 | Colton et al. | |
| 5,245,609 A | 9/1993 | Ofek et al. | |
| 5,307,449 A | 4/1994 | Keiley et al. | |
| 5,329,619 A | 7/1994 | Pagé et al. | |
| 5,426,674 A | 6/1995 | Nemirovsky et al. | |
| 5,524,212 A | 6/1996 | Somani et al. | |
| 5,581,689 A | 12/1996 | Slominski et al. | |
| 5,598,532 A | 1/1997 | Liron | |
| 5,634,004 A | 5/1997 | Gopinath et al. | |
| 5,634,011 A | 5/1997 | Auerbach et al. | |
| 5,649,105 A | 7/1997 | Aldred et al. | |
| 5,651,005 A | 7/1997 | Kwok et al. | |
| 5,793,362 A | 8/1998 | Matthews et al. | |
| 5,805,578 A | 9/1998 | Stirpe et al. | |
| 5,815,402 A | 9/1998 | Taylor et al. | |

(Continued)

FOREIGN PATENT DOCUMENTS

WO WO-96/17458 A 6/1996

OTHER PUBLICATIONS

Ward, Julie, et al., "Storage Area Network Fabric Design," PowerPoint presentation given at the Math Sciences Research Institute Conference on Combinational Design, Berkeley, California, Nov. 8, 2000.

(Continued)

*Primary Examiner*—Robert B. Harrell

(57) ABSTRACT

A technique for providing reliability to an interconnect fabric for communication among a set of nodes. The technique may be used to efficiently and programmatically produce a cost-effective interconnect fabric having a degree of reliability over a range of design problems. In one aspect, ports associated with each node are partitioned into a first set of ports and a second set of ports. A primary interconnect fabric is formed among the first set of ports in response to a set of flow requirements and a backup interconnect fabric is formed among the second set of ports. The backup interconnect fabric carries a portion of communications carried by the primary fabric so as to protect against a failure of an element in the primary fabric.

36 Claims, 13 Drawing Sheets

U.S. PATENT DOCUMENTS

| | | | |
|---|---|---|---|
| 5,831,996 | A | 11/1998 | Abramovici et al. |
| 5,835,498 | A | 11/1998 | Kim et al. |
| 5,838,919 | A | 11/1998 | Schwaller et al. |
| 5,857,180 | A | 1/1999 | Hallmark et al. |
| 5,878,232 | A | 3/1999 | Marimuthu |
| 5,970,232 | A | 10/1999 | Passint et al. |
| 5,987,517 | A | 11/1999 | Firth et al. |
| 6,003,037 | A | 12/1999 | Kassabgi et al. |
| 6,031,984 | A | 2/2000 | Walser |
| 6,038,219 | A | 3/2000 | Mawhinney et al. |
| 6,047,199 | A | 4/2000 | DeMarco |
| 6,052,360 | A | 4/2000 | Rogers |
| 6,108,782 | A | 8/2000 | Fletcher et al. |
| 6,141,355 | A | 10/2000 | Palmer et al. |
| 6,148,000 | A | 11/2000 | Feldman et al. |
| 6,157,645 | A | 12/2000 | Shobatake |
| 6,195,355 | B1 | 2/2001 | Demizu |
| 6,212,568 | B1 | 4/2001 | Miller et al. |
| 6,253,339 | B1 | 6/2001 | Tse et al. |
| 6,331,905 | B1 | 12/2001 | Ellinas et al. |
| 6,345,048 | B1 | 2/2002 | Allen et al. |
| 6,363,334 | B1 | 3/2002 | Andrews et al. |
| 6,418,481 | B1 | 7/2002 | Mancusi et al. |
| 6,442,584 | B1 | 8/2002 | Kolli et al. |
| 6,452,924 | B1 | 9/2002 | Golden et al. |
| 6,526,420 | B2 | 2/2003 | Borowsky et al. |
| 6,539,027 | B1 | 3/2003 | Cambron |
| 6,539,531 | B2 | 3/2003 | Miller et al. |
| 6,557,169 | B1 | 4/2003 | Erpeldinger |
| 6,570,850 | B1 | 5/2003 | Gutierrez et al. |
| 6,594,701 | B1 | 7/2003 | Forin |
| 6,598,080 | B1 | 7/2003 | Nagami et al. |
| 6,603,769 | B1 | 8/2003 | Thubert et al. |
| 6,611,872 | B1 | 8/2003 | McCanne |
| 6,614,796 | B1 | 9/2003 | Black et al. |
| 6,625,777 | B1 | 9/2003 | Levin et al. |
| 6,628,649 | B1 | 9/2003 | Raj et al. |
| 6,633,909 | B1 | 10/2003 | Barrett et al. |
| 6,650,639 | B2 | 11/2003 | Doherty et al. |
| 6,668,308 | B1 | 12/2003 | Barroso et al. |
| 6,675,328 | B1 | 1/2004 | Krishnarnachari et al. |
| 6,687,222 | B1 * | 2/2004 | Albert et al. .............. 370/230 |
| 6,694,361 | B1 | 2/2004 | Shah et al. |
| 6,697,334 | B1 | 2/2004 | Klincewicz et al. |
| 6,697,369 | B1 | 2/2004 | Dziong et al. |
| 6,697,854 | B1 | 2/2004 | Glassen et al. |
| 6,701,327 | B1 | 3/2004 | Jones et al. |
| 6,724,757 | B1 | 4/2004 | Zadikian et al. |
| 6,744,767 | B1 | 6/2004 | Chiu et al. |
| 6,757,731 | B1 | 6/2004 | Barnes et al. |
| 6,766,381 | B1 | 7/2004 | Barker et al. |
| 6,778,496 | B1 | 8/2004 | Meempat et al. |
| 6,804,245 | B2 | 10/2004 | Mitchem et al. |
| 6,857,027 | B1 | 2/2005 | Lindeborg et al. |
| 2002/0083159 | A1 | 6/2002 | Ward et al. |
| 2002/0091845 | A1 | 7/2002 | Ward et al. |
| 2002/0120770 | A1 | 8/2002 | Parham et al. |
| 2002/0156828 | A1 | 10/2002 | Ishizaki et al. |
| 2002/0188732 | A1 | 12/2002 | Buckman et al. |
| 2003/0065758 | A1 | 4/2003 | O'Sullivan et al. |
| 2003/0144822 | A1 | 7/2003 | Peh et al. |
| 2003/0145294 | A1 | 7/2003 | Ward et al. |
| 2005/0021583 | A1 | 1/2005 | Andrzejak et al. |
| 2005/0021831 | A1 | 1/2005 | Andrzejak et al. |
| 2005/0033844 | A1 | 2/2005 | Andrzejak et al. |

OTHER PUBLICATIONS

Ward, Julie, et al., "Storage Area Network (SAN) Fabric Design," PowerPoint presentation given at the INFORMS International Conference, Maui, Hawaii, Jun. 19, 2001.

Ward, Julie, et al., "Storage Area Network (SAN) Fabric Design," PowerPoint presentation given at Berkeley, IEOR Department Seminar, Berkeley, California, Oct. 8, 2001.

Mathew Andrews et al., Integrated Scheduling of Unicast and Multicast Traffic in an Input-Queued Switch, 1999. <http://cm.bell-labs.com/cm/ms/who/andrews/infocom99switch.ps> .

Viraphol Chaiyakul, Assignment Decision Diagram for High-Level Synthesis, 1992.

Andre Dehon, Notes on Coupling Processors with Reconfigurable Logic, MIT Transit Project, Transit Note #118, 1995.

Cathy Fulton et al., Impact Analysis of Packet-Level Scheduling On an ATM Shared-Memory Switch, Infocom, vol. 3 pp. 947-954, 1998, IEEE, New York, NY.

Hiroshi Inose, An Introduction to Digital Integrated Communication Systems, pp. 87-89, 1979, Peter Peregrinus Ltd., Stevenage, United Kingdom.

A. Richard Newton, Interface-Based Design; Introduction, University of California at Berkeley, Apr. 1999.

Derek C. W. Pao, A Congestion Control Algorithm for Multipoint-to-Multipoint ABR Service in ATM Network, Proceedings of the IEEE Conference on High Performance Switching and Routing, pp. 167-175, Jun. 26, 2000, IEEE Press, New York, NY.

Rainer Schoenen et al., Weighted Arbitration Algorithms with Priorities for Input-Queued Switches with 100% Thoughput, 1999, <http://www.iss.rwth-aachen.de/Projekte/Theo/papers/Schoenen99bssw.ps.gz>.

Oryal Tanir et al., Structural Reuse In The Design of ATM Switch Fabrics, 1997.

I. Widjaja et al., Performance Issues in VC-Merge Capable ATM LSRs, RFC 2682, Sep. 1999, THe Internet Society, Reston, VA.

Julie Ward, U.S. Appl. No. 09/707,227, filed Nov. 6, 2000.

D. Klingman et al. Netgen: A Program for Generating Large Scale Capacitated Assignment, Transportation, and Minimum Cost Flow Network Problems, Management Science 20(5):814-821, 1974, The Institute Of Management Sciences, Providence, RI.

Dimitri P. Bertsekas, Linear Network Optimization: Algorithms and Codes, pp. 253-260, 1991, The MIT Press, Cambridge, MA.

Julie Ward et al., Appia: Automatic Storage Area Network Fabric Design, Conference on File and Storage Technologies (Fast'02), pp. 203-217, Jan. 28, 2002, Usenix, Berkeley, CA.

Staffan Bo Strand, Storage Area Networks and Santk, Thesis, Dec. 2001, University of Minnesota, MN.

Matthew T. O'Keefe et al., Designing Fibre Channel Storage Area Networks, Feb. 2001. <http://www.borg.umn.edu/fc/papers/SANTK.pdf>.

Robert E. Bixby, Solving Real-World Linear Programs: A Decade and More of Progress, Jan. 2002.

Ravindra K. Ahuja et al., Network Flows: Theory, Algorithms, and Applications, pp. 4-9, 649-686, 1993, Prentice-Hall , Upper Saddle River, NJ.

Christodoulos A. Floudas et al., Quadratic Optimization, 1995.

Parameswaran Ramanathan et al., Resource Placement with Multiple Adjacency Constraints in k-ary n-Cubes, 1995.

Staffan Strand, Automatic Generation of Core/Edge Topology SANs Using SANTK, May 23, 2002.

Joachim P. Walser, Solving Linear Pseudo-Boolean Constraint Problems with Local Search, 1997, American Association for Artificial Intelligence, Menlo Park, CA.

Julie Ward Drew et al., U.S. Appl. No. 10/290,760, filed Nov. 8, 2002.

Julie Ward Drew, U.S. Appl. No. 10/290,643, filed Nov. 8, 2002.

Julie Ward Drew et al., U.S. Appl. No. 10/845,855, filed May 13, 2004.

* cited by examiner

RELIABILITY FOR INTERCONNECT FABRICS

This is a continuation-in-part of U.S. application Ser. No. 09/707,227, filed Nov. 6, 2000, the contents of which are hereby incorporated by reference.

FIELD OF THE INVENTION

The present invention relates to the field of networks. More particularly, this invention relates to reliability of networks.

BACKGROUND OF THE INVENTION

An interconnect fabric provides for communication among a set of nodes in a network. Communications originate within the network at a source node and terminate at a terminal node. Thus, a wide variety of networks may be viewed as a set of source nodes that communicate with a set of terminal nodes via an interconnect fabric. For example, a storage area network may be arranged as a set of computers as source nodes which are connected to a set of storage devices as terminal nodes via an interconnect fabric that includes communication links and devices such as hubs, routers, switches, etc. Devices such as hubs, routers, switches, etc., are hereinafter referred to as interconnect devices. Depending on the circumstances, a node may assume the role of source node with respect to some communications and of terminal node for other communications.

The communication requirements of an interconnect fabric may be characterized in terms of a set of flow requirements. A typical set of flow requirements specifies the required communication bandwidth from each source node to each terminal node. The design of an interconnect fabric usually involves selecting the appropriate arrangement of physical communication links and interconnect devices and related components that will meet the flow requirements.

An interconnect fabric that meets the minimum flow requirements under ideal conditions will not necessarily meet the flow requirements under other conditions, such as in the event of a failure of a communication link, interconnect device or related component. Therefore, network designers typically address these reliability considerations by building in excess capacity or redundancy to help meet flow requirements under adverse conditions. Prior techniques are largely ad hoc and, thus, tend to be time-consuming, error-prone and may result in an over-provisioned interconnect fabric.

SUMMARY OF THE INVENTION

A technique is disclosed for providing reliability to an interconnect fabric for communication among a set of nodes. The technique may be used to efficiently and programmatically produce a cost-effective interconnect fabric having a degree of reliability over a range of design problems.

In one aspect, reliability is provided to an interconnect fabric for communication among a set of nodes. Ports associated with each node are partitioned into a first set of ports and a second set of ports. A primary interconnect fabric is formed among the first set of ports in response to a set of flow requirements. A backup interconnect fabric is formed among the second set of ports. The backup interconnect fabric carries a portion of communications carried by the primary fabric so as to protect against occurrence of a failure in the primary fabric.

In another aspect, reliability is provided to an interconnect fabric for communication among a set of nodes. One or more failure modes are identified in a primary interconnect fabric that carries communications among the set of nodes via a first set of ports of the nodes. A backup interconnect fabric is formed among a second set of ports of the nodes for carrying a portion of the communications of the primary fabric so as to protect against occurrence of any single one of the failure modes of the primary fabric.

In yet another aspect, reliability is provided to a design for an interconnect fabric for communication between a set of nodes. A set of design information includes a set of flow requirements for the interconnect fabric. A fabric design tool generates a primary design for the interconnect fabric among of first set of ports of the nodes. The primary design is in response to the flow requirements. The design tool also generates a backup design for the interconnect fabric among a second set of ports for the nodes. The backup design carries a portion of communications carried by the primary fabric so as to protect against occurrence of any single one of failure modes of the primary fabric.

The backup interconnect fabric may be formed by generating arrangements of flow sets in response to the flow requirements, determining feasibility of merging pairs of candidate flow sets and merging a pair of the flow sets. The feasibility of merging candidate flow sets may depend on a sum of flow requirements in the candidate flow sets that are interrupted by a single failure in the primary fabric or may depend on a highest sum of flow requirements in the candidate flow sets that are interrupted by different failures in the primary interconnect fabric.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT

Figure 1:
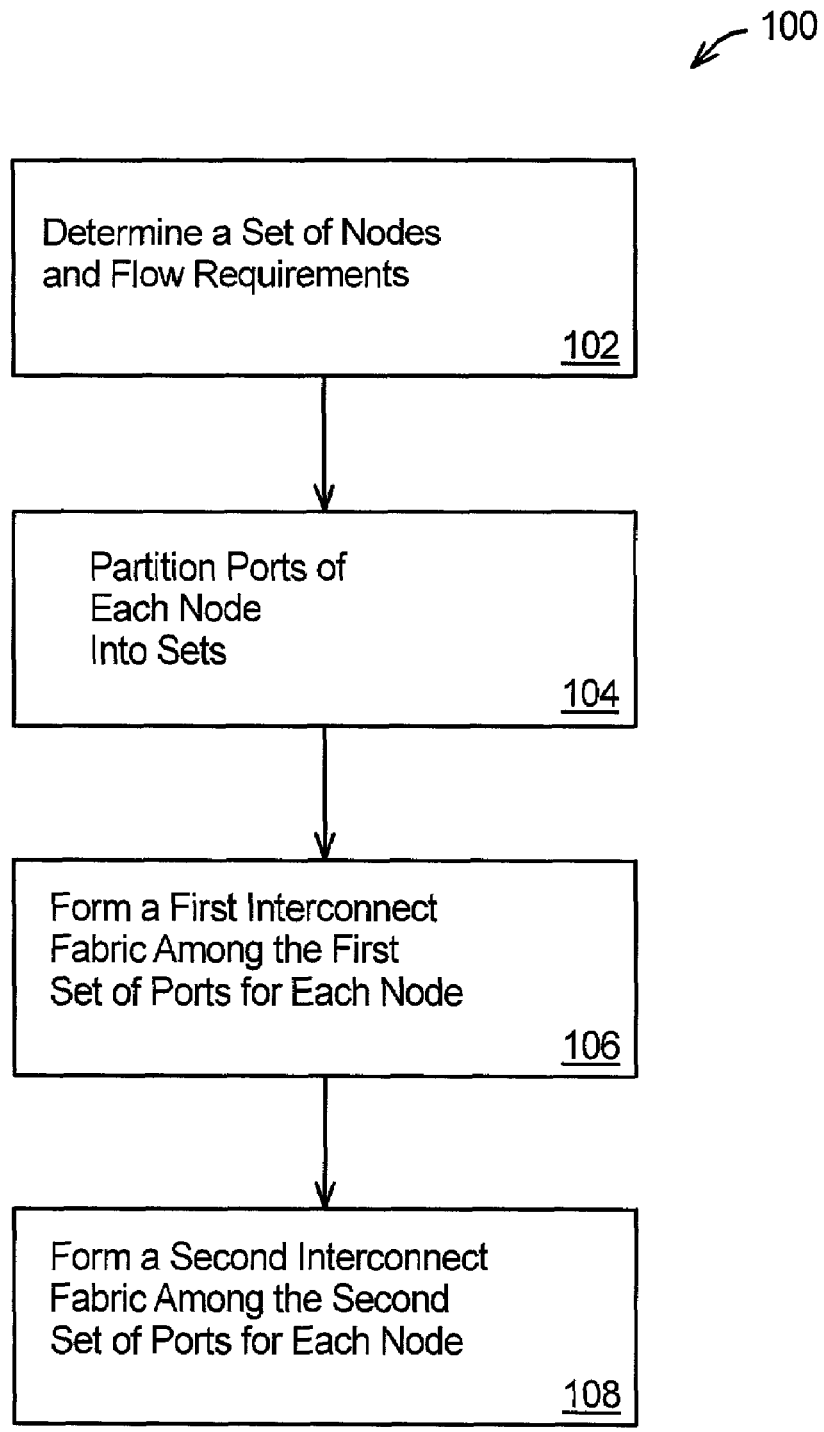
FIG. 1 shows a method for providing reliability to an interconnect fabric according to an embodiment of the present invention.

FIG. 1 shows a method 100 for providing reliability to an interconnect fabric according to an embodiment of the present invention. The method 100 partitions ports at each node into sets and forms primary and backup interconnect fabrics among the ports of each set based on flow requirements among the nodes. Reliability is provided because multiple fabrics interconnect the nodes. The backup interconnect fabric can preferably carry at least a portion of the communications of the primary fabric so as to protect against a failure of an element in the primary fabric. Preferably, for every failure in the primary fabric, the backup fabric is able to route the affected flows. For example, if a link breaks in the primary network, the backup fabric should be able to handle the flows previously routed through the broken link.

In a step 102, a set of nodes to be interconnected by an interconnect fabric, and flow requirements among the nodes, are determined. Table 1 shows an example set of flow requirements for an interconnect fabric under design.

|  | Terminal Node 50 | Terminal Node 52 | Terminal Node 54 |
|---|---|---|---|
| Source Node 40 | a | b | c |
| Source Node 42 | d | e | f |

The flow requirements in this example specify two source nodes (source nodes 40–42 in the figures below) and three terminal nodes (terminal nodes 50–54 in the figures below). If an interconnect fabric is to meet the flow requirements, it must contain communication paths between all pairs of the source and terminal nodes 40–42 and 50–54 having positive flow requirements and must have sufficient bandwidth to support all of the flow requirements simultaneously.

In one embodiment, the source nodes 40–42 are host computers and terminal nodes 50–54 are storage devices. Thus, the interconnect fabric under design may be storage area network.

The bandwidth values for flows a, b, c, d, e and f may be numbers expressed in units of megabits per second (Mb/s). For this example, assume that each of the flows a, b, c, d, e and f have a bandwidth requirement of 33 Mb/s.

In other embodiments, there may be multiple flow requirements between a given source and terminal node pair. In such embodiments, the cells of Table 1 would contain a list of two or more entries. And, depending on the circumstances, a node may assume the role of source node with respect to some communications and of terminal node for other communications.

Figure 2:
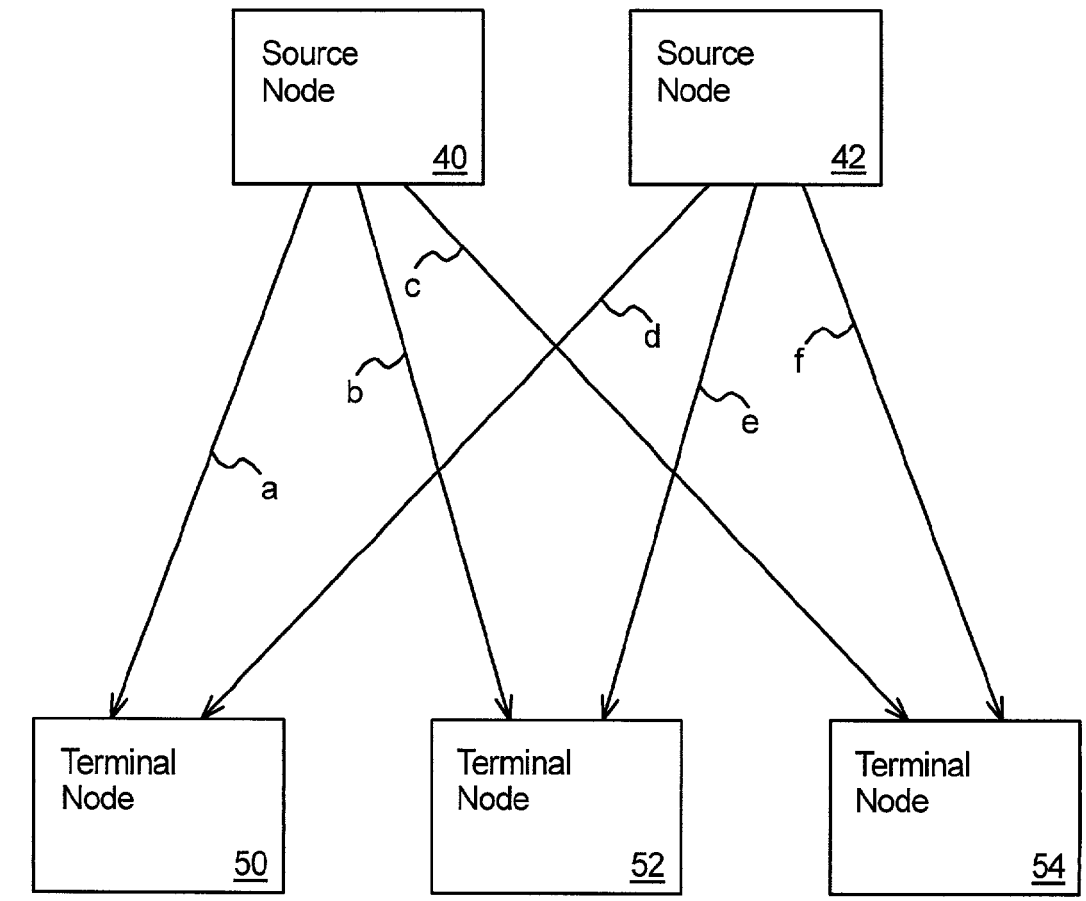
FIG. 2 shows an arrangement of flow sets in an interconnect fabric for an example design according to an embodiment of the present invention.

FIG. 2 shows an initial arrangement of flows for the flow requirements obtained at step 102 for this example. Each entry in the flow requirements table is represented by a communication path or flow between pairs of nodes. More particularly, flow a is between the source node 40 and terminal node 50, flow b is between source node 40 and terminal node 52, flow c is between source node 40 and terminal node 54, flow d is between source node 42 and terminal node 50, flow e is between source node 42 and terminal node 52, flow f is between source node 42 and terminal node 54.

Figure 3:
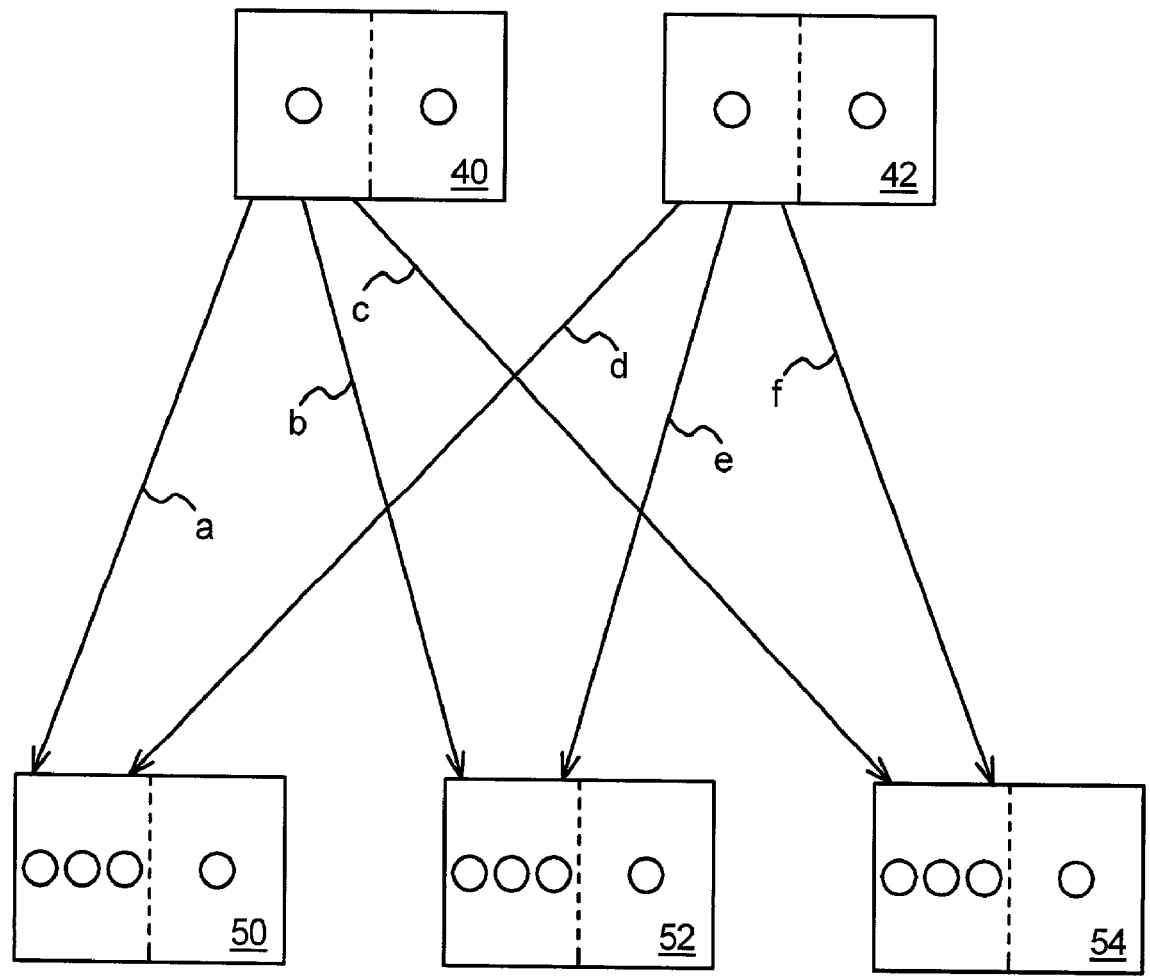
FIG. 3 shows how ports at each node may be partitioned into sets for the example design according to an embodiment of the present invention.

At step 104, the ports of each node may be partitioned into sets. For example, the ports at each node may be divided into two sets. In one embodiment, a first set includes all of the ports for each node, save one, and a second set includes the remaining port not assigned to the first set. In other embodiments, the ports of each node could be further divided into an additional number of (k) sets. In which case, additional fabrics may used to interconnect the additional sets of ports to provide even greater redundancy and reliability. FIG. 3 shows how ports at each node may be partitioned into two sets for the example design. In the example, each of nodes 40 and 42 has two ports and each of nodes 50, 52 and 54 has four ports. Assume for this example that each of these ports has a bandwidth capacity of 100 Mb/s. Note that if a node has only one port, the port may be split among the sets by connecting an interconnect device having at least three ports, such as a hub or repeater, to the port. The remaining ports of the interconnect device may then be partitioned into the sets as ports belonging to the node.

In the example, a first set of ports includes one port of each of the nodes 40 and 42 and three ports of each of the nodes 50, 52 and 54. A second set of ports includes one port of each of the nodes 40, 42, 50, 52 and 54. The first set includes those ports to the left of a dotted line (shown in FIG. 3) which divides each node, while the second set includes those of ports shown to the right of the dotted line.

In a step 106 (FIG. 1), a primary interconnect fabric is formed among a first set of ports to support the flow requirements for the design. Thus, the flows of FIG. 2 are shown in FIG. 3 as being supported by the first set of ports for each node.

Figure 4:
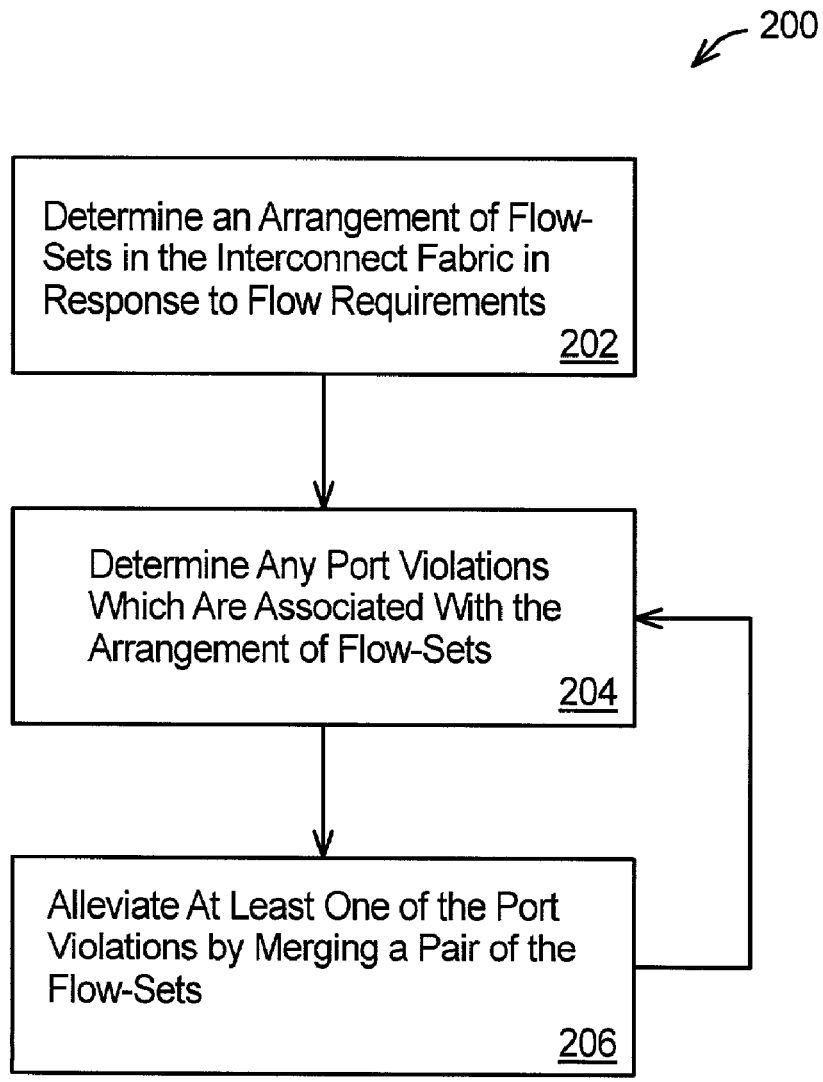
FIG. 4 shows a method for forming an interconnect fabric among a first set of ports according to an embodiment of the present invention.

FIG. 4 shows a method 200 for forming an interconnect fabric among a first set of ports according to an embodiment of the present invention. The method 200 is disclosed in U.S. application Ser. No. 09/707,227, filed Nov. 16, 2000, the contents of which are hereby incorporated by reference, and may be performed during the step 106 of FIG. 1. It will be apparent, however, that other techniques for forming an interconnect fabric, such as manual or other methods, may be used in the step 106.

The method 200 partitions the flow requirements of the interconnect fabric into flow sets and iteratively merges the flow sets while taking into account the feasibility and cost of implementing the interconnect fabric.

At step 202, an arrangement of flow sets in the interconnect fabric is determined in response to the set of flow requirements for the source and terminal nodes. In one embodiment, step 202 is performed by generating a flow set for each flow specified in the flow requirements for the interconnect fabric. Thus, each of flows a, b, c, d, e and f of the example is initially included in a corresponding flow set having one flow.

At step 204, port violations which are associated with the arrangement of flow sets among the first set of ports are determined. In the example, port violations are determined for the first set of ports for each source node 40–42 and each terminal node 50–54. In general, the number of port violations is equal to the sum, over all flow sets, of the number of required physical communication links to the node from that flow set, minus the number of available ports in the set of ports at the node. Each flow set may require one or more physical communication links to a given source or terminal node in the network.

In this example (FIG. 3), the number of port violations for a node is equal to the number of flow sets connected to the node minus the number of available ports in first set of ports for the node because each flow set is carried by one physical communication link in the interconnect fabric. Thus, the source node 40 has a port violation of two since each of its three flow sets requires one physical communication link to the source node 40 and the source node 40 has only one available port in the first set. Similarly, the source node 42 also has a port violation of two since each of its three flow sets requires one physical communication link to the source node 42 and the source node 42 has only one available port in the first set. The terminal nodes 50–54 have no port violations since the number of ports in the first set is greater than the number of flow sets. More particularly, each of the terminal nodes 50–54 has three available ports in the first set, but only two flow sets that each require one physical communication link to the node.

In other examples, the number of available ports in the first set for the source nodes 40–42 and the terminal nodes 50–54 may differ and the number of physical communication links required by a flow set on a given source or terminal node it connects to may exceed one.

At step 206 (FIG. 4), at least one of the port violations is alleviated by merging a pair of the flow sets. Step 206 initially involves selecting the pair of flow sets in the current interconnect fabric that are to be merged. Initially, a candidate pair of flow sets is chosen that would alleviate the port violation on a node with the greatest port violation if merged. If there is more than one such candidate pair then one of the candidate pairs that alleviates a port violation on a node having the next greatest port violation is chosen from among them. If there is more than one such candidate pair then a pair of them that would be least costly to merge is chosen. The cost of merging two candidate pairs may be determined by choosing the least expensive interconnect device that is feasible for the merged flow set.

In the current state of the example interconnect fabric shown in FIG. 3, the source nodes 40 and 42 each has a port violation of two, which is the worst port violation in the network, and its corresponding flow sets are candidates for merging at step 206. For example, the pair of flow sets having flows a and b or the pair of flow sets having flows b and c or the pair of flow sets having flows a and c may be chosen as candidate pairs. All of these candidate pairs, if merged, would alleviate one port violation from the terminal node 40 but none of them would alleviate any other port violations. Therefore, the cost of merging the candidate pairs may be used to select the candidate pair of flow sets at step 206. For example, the communication link and/or interconnect device and/or ports that are used to merge the flow sets having flows a and b may be less expensive than the equivalent components needed to merge the other equally qualified candidate pairs. For example, assuming that link cost is related to length, replacing two links over a longer distance with a single link would likely reduce costs more than if over a shorter distance.

The candidate pairs of flow sets considered at step 206 must be feasible to merge. An example of a pair of flow sets that is not feasible to merge is a pair for which an interconnect device of sufficient bandwidth is not available. For example, a flow set having 60 units of bandwidth cannot be merged with a flow set having 50 units of bandwidth if the highest bandwidth interconnect device available has 100 units. Another example of a pair of flow sets that is not feasible to merge is a pair that would exceed the available ports on every available interconnect device of the resulting flow set. Candidate pairs that are not feasible to merge are bypassed at step 206 in favor of other candidate pairs.

If port violations still exist in the interconnect fabric after step 206, then another candidate pair of flow sets is selected and merged in a repeat of step 206. The method 200 loops through steps 204–206 in an iterative fashion until all port violations are eliminated or until no further merges are feasible.

Figure 5:
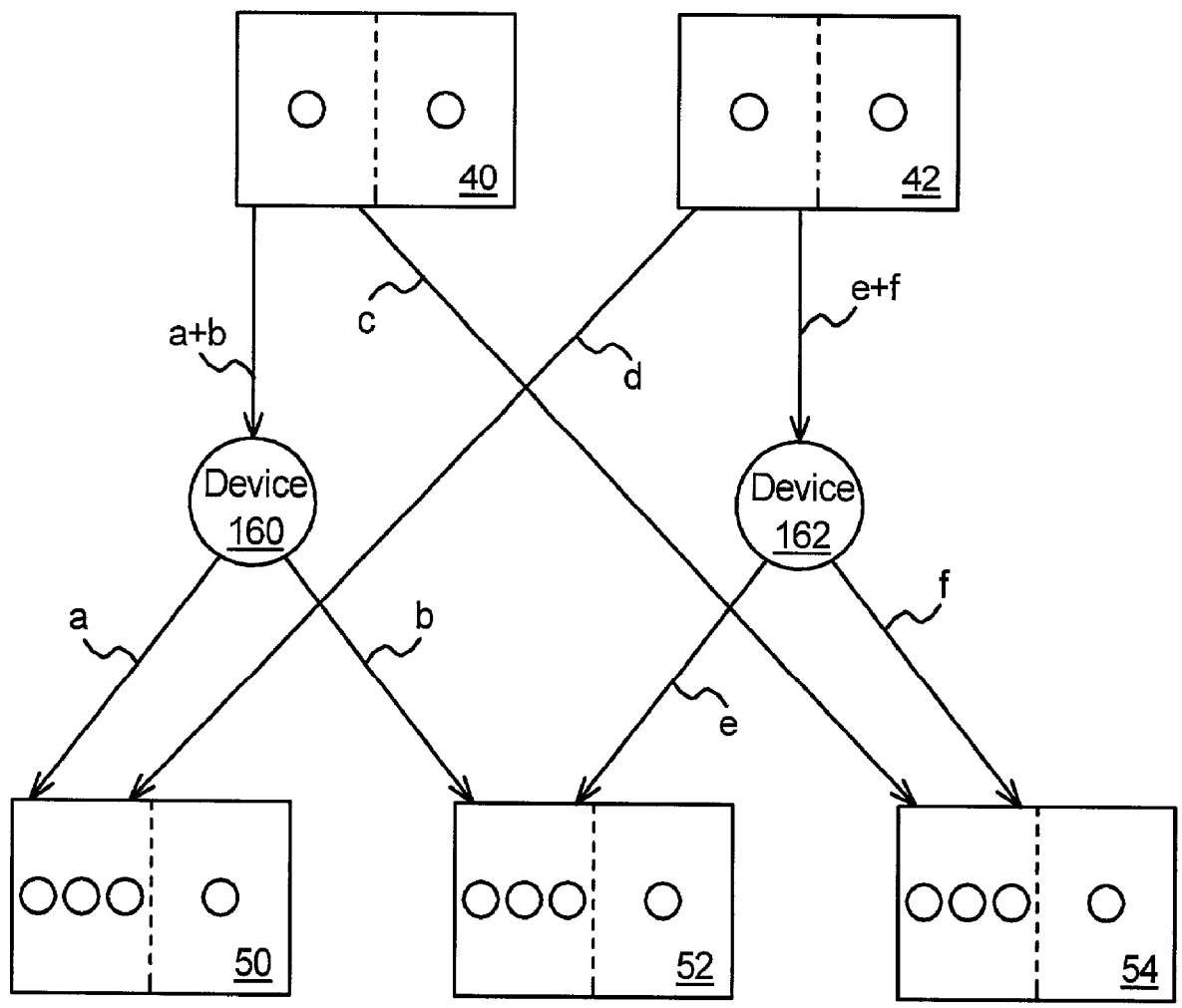
FIGS. 5–6 show a primary interconnect fabric for the example design evolving according to an embodiment of the present invention.

FIG. 5 shows an interconnect fabric including a flow set having an interconnect device 160, a flow of a and a flow of b that is the result of the merger of the flow set having the flow of a and the flow set having the flow of b. Assume that the interconnect device 160 and other available devices are hubs that each have an aggregate bandwidth capacity of 100 Mb/s. This means that the total bandwidth of flows entering or exiting the device cannot exceed 100 Mb/s. The merger of flows a and b by the device 160 is feasible insofar as the aggregate of these flows is 66 Mb/s, which is less than the maximum bandwidth for the device 160, which in the example is 100 Mb/s.

In a next pass through the step 206, a pair of flow sets from among those having the flows d, e and f may be merged to alleviate the port violation of two at the source node 42. Thus, as shown in FIG. 5, the interconnect fabric includes a flow set having an interconnect device 162, a flow of e and a flow of f that is the result of the merger of the flow set having the flow of e with the flow set having the flow of f. Thus, FIG. 5 shows the interconnect fabric after two passes through the step 206. The merger of flows e and f by the device 162 is feasible insofar as the aggregate of these flows is 66 Mb/s, which is less than the maximum bandwidth for the device 162, which in the example is 100 Mb/s.

At this point, the interconnect fabric has a port violation of one at each of the source nodes 40 and 42. Then, another pass through the step 206 may result in the selection and merger of the flow set corresponding to the interconnect device 160 and with the flow set including the flows a and b with the flow set including the flow c which alleviates the port violation of the source node 40. The merger of flows a, b and c by the device 160 is feasible insofar as the aggregate of these flows is 99 Mb/s, which is less than the maximum bandwidth for the device 160, which in the example is 100 Mb/s.

A further pass through the step 206 may result in the selection and merger of the flow set corresponding to the interconnect device 162 and with the flow set including the flows e and f with the flow set including the flow d which alleviates the port violation of the source node 42. The merger of flows d, e and f by the device 160 is feasible insofar as the aggregate of these flows is 99 Mb/s, which is less than the maximum bandwidth for the device 160, which in the example is 100 Mb/s.

Figure 6:
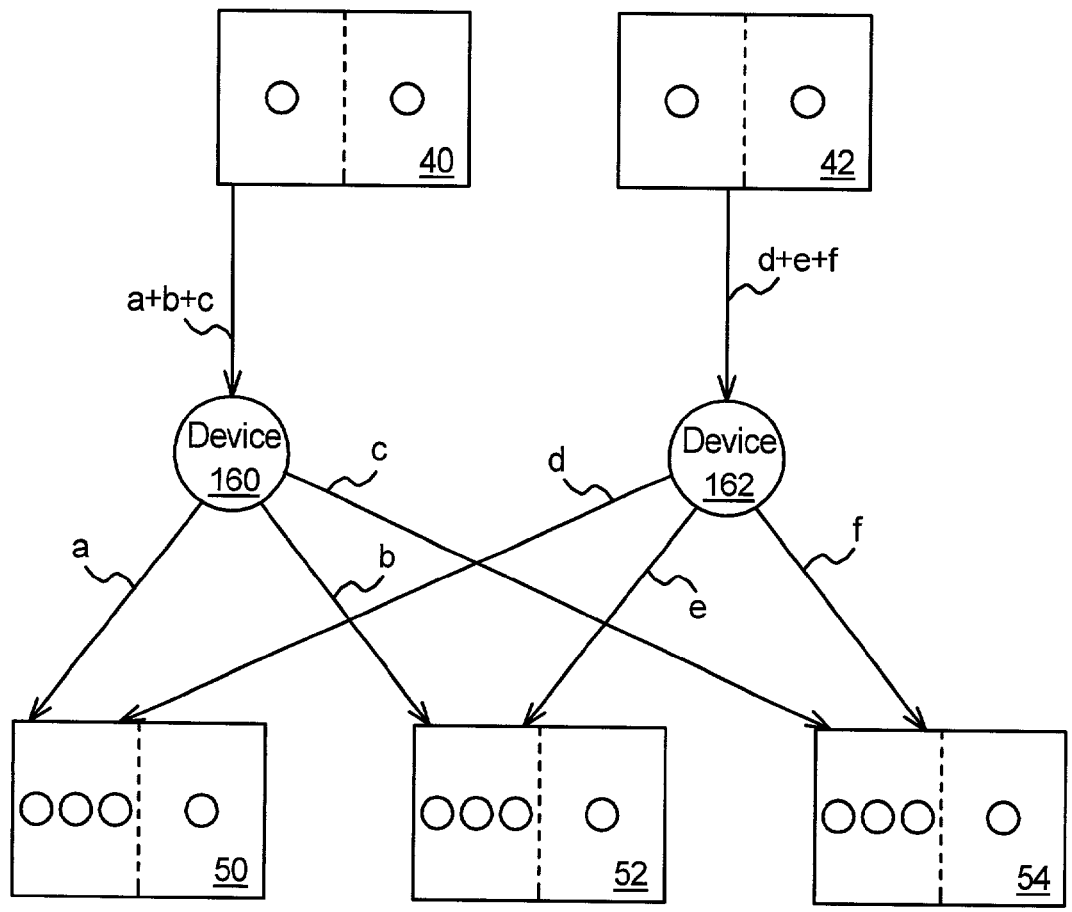

FIG. 6 shows an interconnect fabric that results from these additional passes through step 206. At this point, the interconnect fabric has no port violation remaining. Accordingly, FIG. 6 shows a primary interconnect fabric that interconnects the first set of ports for each node and that will support the flow requirements for the network. Note that if cost savings may be obtained by merging additional flow sets, such mergers may also be accomplished if feasible by making another pass through step 206.

Returning to the method 100 of FIG. 1, once the primary interconnect fabric has been formed in the step 106 among the first set of ports, a secondary or backup interconnect fabric may be formed in the step 108 among the second set of ports. This backup interconnect fabric carries at least a portion of the flows that the primary fabric carries in order to protect against a failure of an element in the primary fabric. While the primary fabric contains communication paths having sufficient bandwidth to support all of the flow requirements simultaneously, the secondary fabric need not support all of the flow requirements simultaneously.

Figure 7:
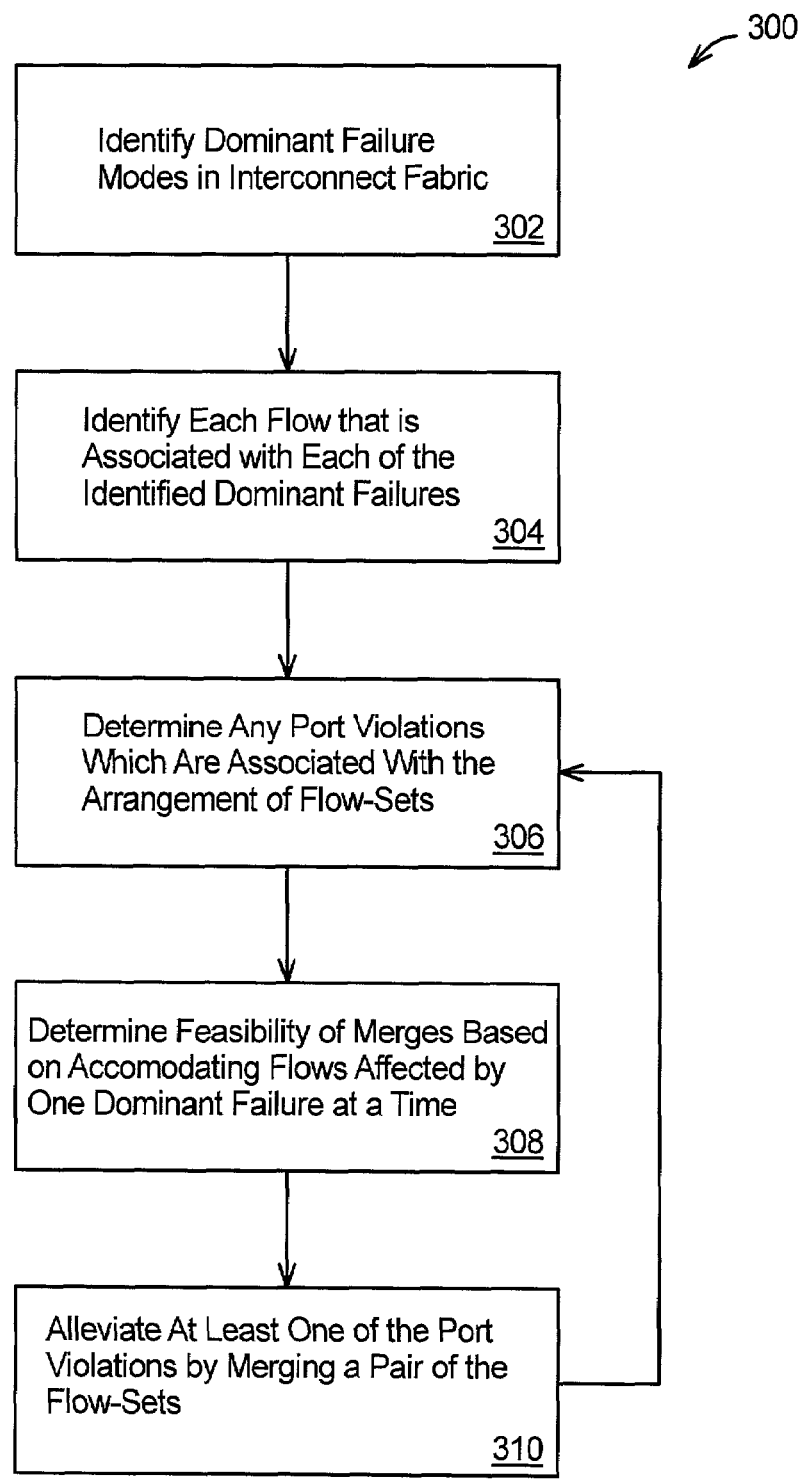
FIG. 7 shows a method for forming a backup interconnect fabric among a second set of ports according to an embodiment of the present invention.

A method 300 illustrated in FIG. 7 may be employed in the step 108 of FIG. 1 to form the backup interconnect fabric. At step 302, possible failure modes of the primary fabric may be analyzed to determine which failure modes are dominant. A failure mode is dominant over other failure modes that would be masked by the occurrence of the dominant failure. In other words, a set of flows whose routes are interrupted by a dominated failure is a subset of the flows affected by a dominating failure. For example, a possible failure mode may be the failure of a single port of an interconnect device such that communication via that port ceases, but other ports of the interconnect device remain functional. Another failure mode may be the failure of the entire interconnect device such that all communication via the device ceases. The failure of the entire interconnect device can be said to dominate the failure of one of its ports since the occurrence of the dominant failure would mask the failure of the port. As another example, a possible failure mode may be the failure of a link which connects a flow between a source and a terminal node without passing through an interconnect device. Such a failure would be considered dominant since it would mask a failure of either the port at the source node that is connected to the link or the port at the terminal node that is connected to the link.

While the complete failure of a source node or terminal node could be said to dominate other failures, the backup interconnect fabric is preferably primarily protective of communications between the nodes, rather than of the nodes themselves. Accordingly, such possible failures of source or terminal nodes may be disregarded for purposes of step 302.

Thus, in one embodiment, the dominating failures identified in the step 302 include interconnect devices in the primary fabric and links in the primary fabric that connect flows directly between source and terminal nodes (without the flows passing through any interconnect devices).

In the example, the interconnect devices 160 and 162 are identified in step 302 as dominant failure points. Because there are no links that connect flows directly between source and terminal nodes in the example, no such links are identified as dominant failures for the example.

In a step 304, each flow that is associated with each dominant failure may be identified. In other words, for each dominant failure identified in step 304, each flow that would be interrupted in the event of the dominant failure may be identified. The flows may also be grouped according to the dominant failure. Thus, for each dominant failure, the affected flows may be grouped together.

In the example, for the dominating failure of the interconnect device 160, the flows that would be interrupted include the flow of a, the flow of b and the flow of c. Thus, the group of flows associated with the failure of device 160 includes the flows a, b and c. For the dominant failure of the interconnect device 162, the flows that would be interrupted include the flow of d, the flow of e and the flow of f. Thus, the group of flows associated with the failure of the device 162 includes the flows d, e and f.

In a step 306, port violations which are associated with the arrangement of flow sets among the second set of ports are determined. The arrangement of flow sets may be determined from the step 202 (FIG. 4) and, thus, the step 202 need not be repeated for the backup fabric. However, the port violations for step 306 may differ from those of step 204 since the second set of ports for the backup fabric will likely include different numbers of available ports compared to the primary fabric.

Figure 8:
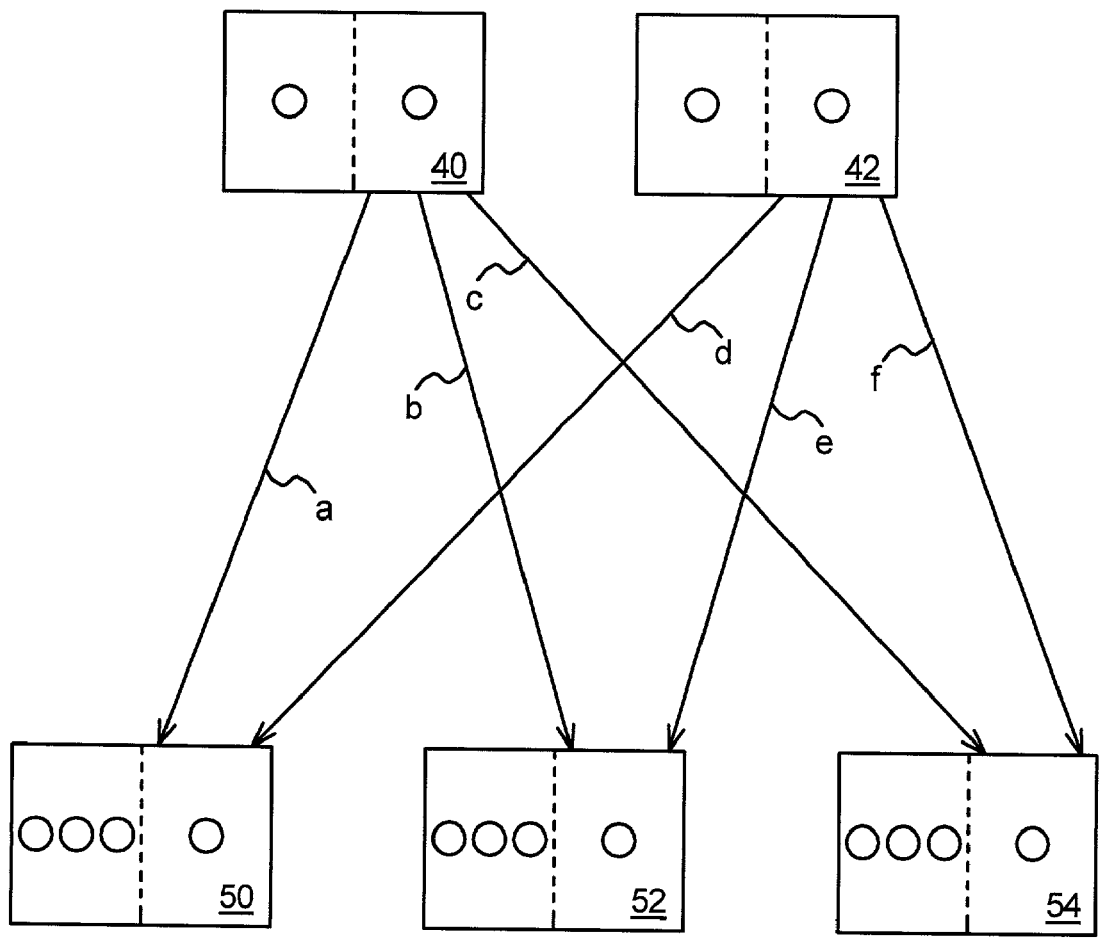
FIGS. 8–11 show a backup interconnect fabric for the example design evolving according to an embodiment of the present invention.

FIG. 8 shows an initial arrangement of flow sets for the backup fabric for the example. The flow sets are similar to those shown in FIG. 3 except that they now interconnect the second set of ports. In the example, port violations are determined for the second set of ports for each source node 40–42 and each terminal node 50–54. The source nodes 40–42 each have a port violation of two since each of their three flow sets requires one physical communication link to the node and each has only one available port in the second set. The terminal nodes 50–54 each have a port violation of one since the number of ports in the second set is one less than the number of flow sets connected to the nodes.

In a step 308, feasibility of possible merges is determined. Recall that that primary fabric is designed to accommodate all of the flows simultaneously. The backup fabric, however, need only accommodate a portion of the flows at any one time. Feasibility of possible merges for the backup fabric in step 308 is determined based on these more limited considerations. In one embodiment, the backup fabric need only provide for flows that are interrupted by the occurrence in the primary fabric of a single dominant failure. Thus, where only one of two different flows would be interrupted during the occurrence of a single dominant failure, their bandwidth requirements need not be simultaneously met. Rather, the worst-case bandwidth requirement for merging the two flows in the backup fabric is the greater requirement of the two flows. For example, if one such flow requires 50 units of bandwidth and the other flow requires 60 units of bandwidth, the worst-case bandwidth requirement is 60 units of bandwidth. However, for pairs of flows that would both be interrupted by the occurrence of a dominant failure, their bandwidth requirements would need to be met simultaneously in order for the network to be able to withstand such a failure. For example, if one such flow requires 50 units of bandwidth and the other requires 60 units, then the aggregated bandwidth requirement to be met by the backup fabric in the event of the failure is 110 units of bandwidth.

Where multiple sets of flows would each be interrupted by the occurrence of different failures, then the worst-case is the greatest sum of flow requirements among the sets. For example, assume that two flows that require 50 and 60 units of bandwidth, respectively, would be interrupted by one failure. Assume also that three other flows each requiring 30 units of bandwidth each would be interrupted by a different failure. The sum of flow requirements for the first set is 110 (50 added to 60), whereas the sum of flow requirements for the second set is 90 (three times 30). Accordingly, the worst-case that needs to be considered for merging these flow sets is the highest sum of 110 units of bandwidth.

Initially, for the example backup fabric of FIG. 8, possible merges include the merger of flows connected to any of the nodes 40–42 or 50–54. This is because each has a port violation of at least one. Further, a merger of any pair of the flows at any node is feasible insofar as the combined bandwidth in each case would be 66 Mb/s which is less than the maximum bandwidth of devices of 100 Mb/s.

Figure 9:
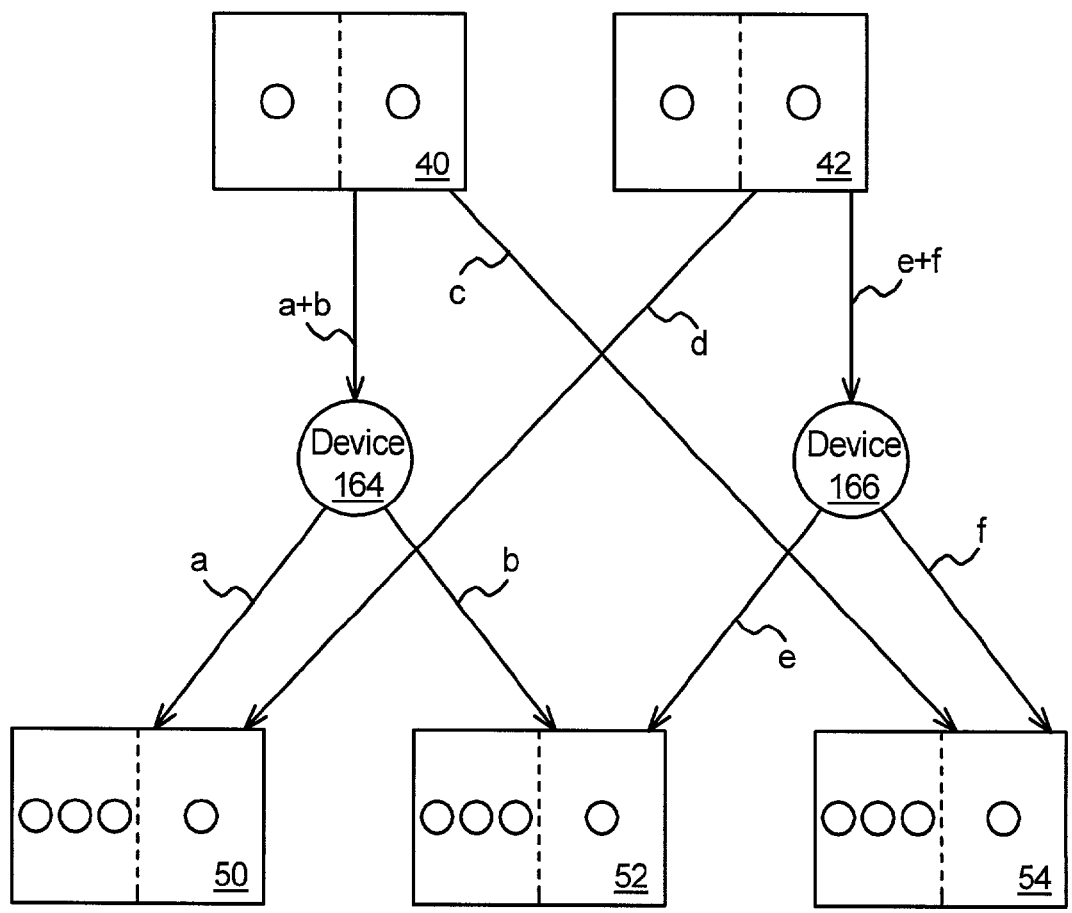

Then, in a step 310, at least one of the port violations is alleviated by merging a pair of the flow sets. Because the source nodes 40 and 42 have the worst port violations, a pair of flow sets at the node 40 may be merged first. For example, the flow sets having flows a and b may be merged by an interconnect device 164, as shown in FIG. 9. The method 300 continues to loop through steps 306–310 in an iterative fashion until all port violations are eliminated or until no further merges are feasible. Thus, in a next pass through the steps 306–310, a pair of flow sets at the node 40 may be merged. For example, the flow sets having flows e and f may be merged by an interconnect device 166, as is also shown in FIG. 9. Thus, FIG. 9 shows the backup fabric after these two merges have been completed.

Figure 10:
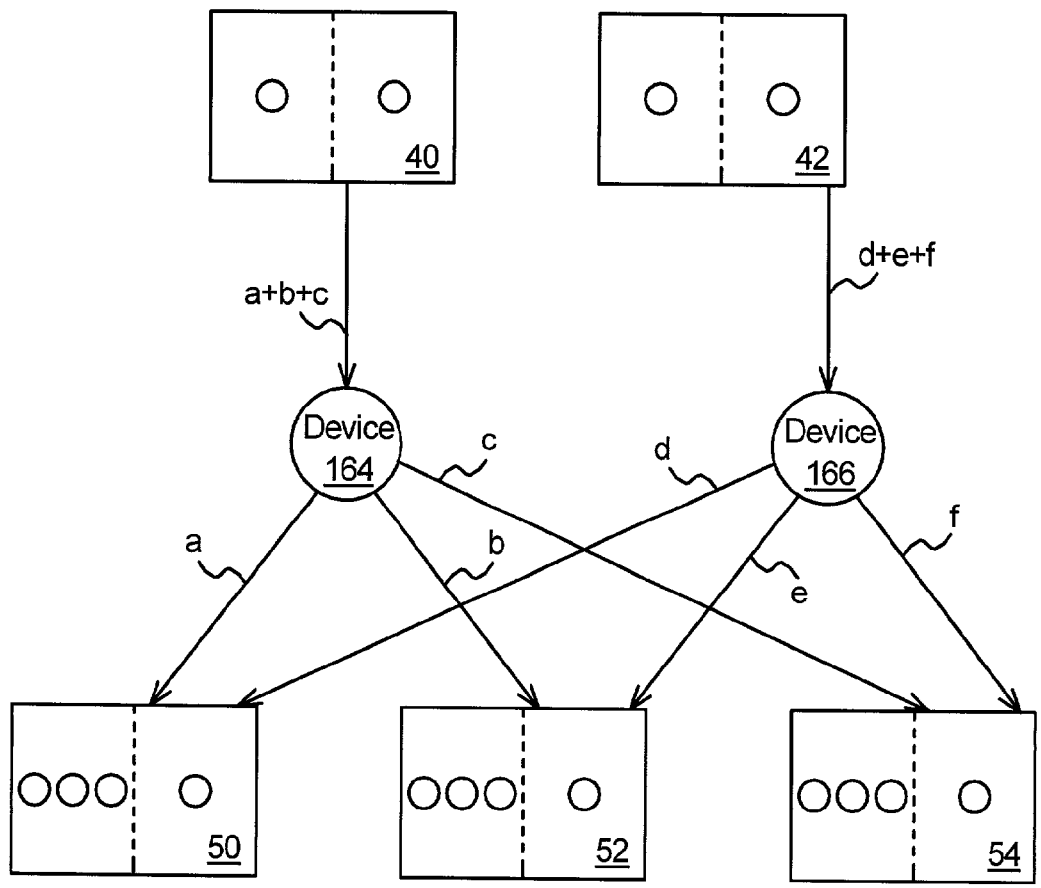

Referring to FIG. 9, each of the nodes 40–42 and 50–54 now has a port violation of one since each node has one available port in the second set and the two flow sets connected to each node each require one physical communication link. In a next pass through the steps 306–310, the flow set having the flow of c may be merged with the flow set having the flow of a, the flow of b and the interconnect device 164. While each of the flows a, b and c would be interrupted by the failure of the device 160 (FIG. 6), merging them is feasible in the backup fabric insofar as their aggregated bandwidth requirement of 99 Mb/s is less than the maximum bandwidth capacity of the interconnect device 164 of 100 Mb/s. Similarly, in a next pass through the steps 306–310, the flow set having the flow of d may be merged with the flow set having the flow of e, the flow of f and the interconnect device 166. While each of the flows e, f and g would be interrupted by the failure of the device 162 (FIG. 6), merging them in the backup fabric is feasible insofar as their aggregated bandwidth requirement of 99 Mb/s is less than the maximum bandwidth capacity of the interconnect device 164 of 100 Mb/s. FIG. 10 shows the backup interconnect fabric after these two merges have been completed.

Recall that for the primary fabric of FIG. 6, no additional merges were feasible since any such merges would exceed the maximum bandwidth capacity of the interconnect devices. As mentioned, however, for the backup interconnect fabric, not all bandwidth requirements are additive when determining whether a merge is feasible. Thus, in the example, the bandwidth requirements of the group of flows including the flows a, b and c are additive with respect to each other because they are all associated with the dominant failure of the interconnect device 160 (FIG. 6). Also in the example, the bandwidth requirements of the group of flows including the flows d, e and f are additive with respect to each other because they are all associated with the dominant failure of the interconnect device 164 (FIG. 6). However, the bandwidth requirements for these flows are not summed with flows in another group. Rather, only the highest bandwidth requirement need be accommodated in order for the network to recover from a dominant failure.

Figure 11:
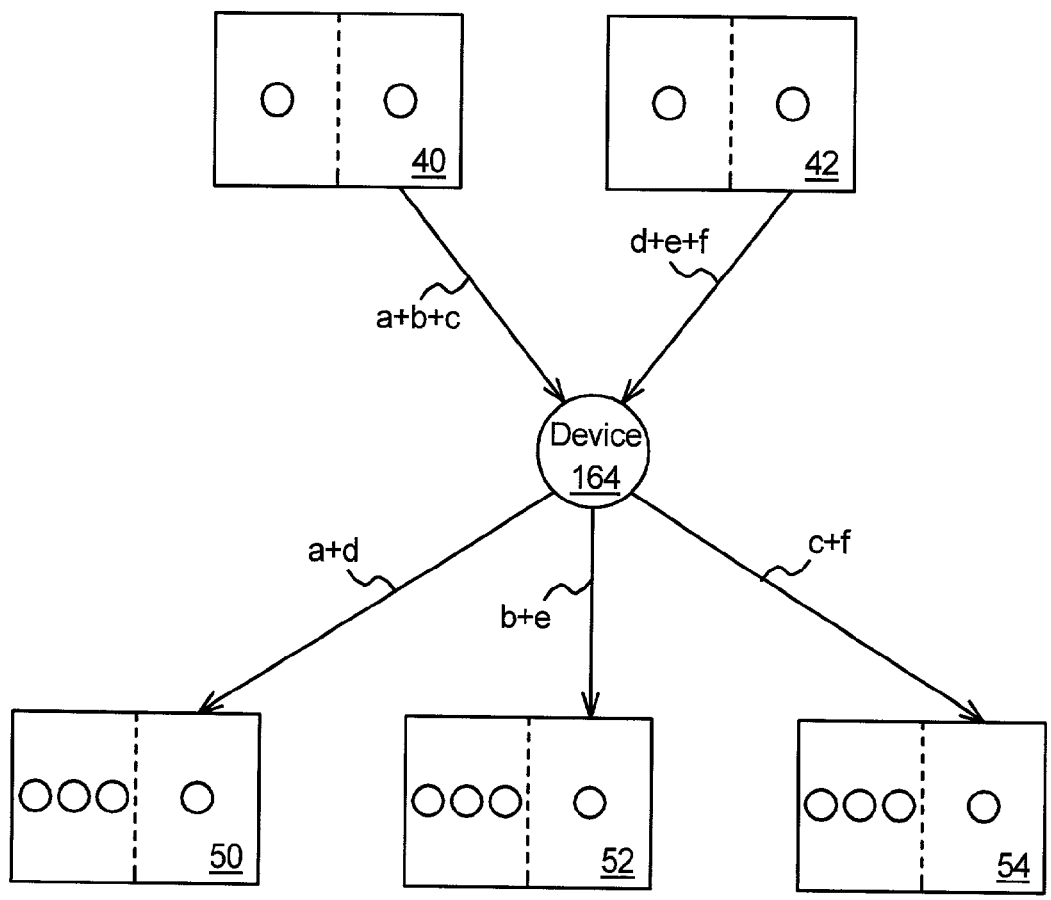

Thus, in the example, to determine the feasibility of merging the flow set having the flows a, b and c with the flow set having the flows d, e and f only the greater bandwidth of the two flow sets needs to be accommodated by an interconnect device. Because each of these flow sets has a bandwidth requirement of 99 Mb/s, the greater of the two is also 99 Mb/s. Because this requirement is less than the maximum bandwidth capacity of the available interconnect devices, this means that these two flow sets can be merged to alleviate the port violations remaining at the terminal nodes 50–54. This is shown in FIG. 11, where the device 164 merges the flow set having the flow of a, the flow of b and the flow of c with the flow set having the flow of d, the flow of e and the flow of f. In addition, the device 166 is eliminated.

The backup fabric of FIG. 11 includes fewer interconnect devices than the primary interconnect fabric of FIG. 6. Thus, the backup fabric can be implemented cost effectively, and with fewer ports at the source and terminal nodes, while still providing for recovery of the network in the event any single dominant failure occurs.

Note that in FIGS. 6 and 11, each flow set has at most one interconnect device associated with it and all of the flows for the flow set are routed through that interconnect device or a single communication link, if possible. Thus, the methods 200 and generally result in fabric designs of a single layer in which there are no links between device nodes.

Under certain circumstances, a single-layer fabric may not eliminate all of the port violations. In which case, the methods 200 and 300, by themselves may not result in a fabric design in which there are no port violations. Thus, in one embodiment, the present invention may address remaining port violations by recursively generating one or more additional layers of interconnect fabric nodes. For port violations at source nodes, the problem (i.e. the current fabric configuration and the applicable design information) may be recast such that the device nodes are treated as the terminal nodes. Then, one or more additional layers of device nodes may be inserted between the source nodes and the device nodes to relieve the port violations at source nodes. This results in links between device nodes and, thus, increases the number of layers in the interconnect fabric. Similarly, for terminal port violations, the problem may be recast such that the device nodes are treated as the source nodes. Then, one or more additional layers of device nodes may be inserted in between the device nodes and the terminal nodes to relieve the terminal node port violations. This also results in links between the device nodes and, thus, increases the number of layers in the interconnect fabric. Such a technique is disclosed in co-pending U.S. application Ser. No. 10/027,564, entitled, "Designing Interconnect Fabrics," and filed Dec. 19, 2001, the contents of which are hereby incorporated by reference and which is continuation-in-part of U.S. application Ser. No. 09/707,227, filed Nov. 16, 2000.

Figure 12:
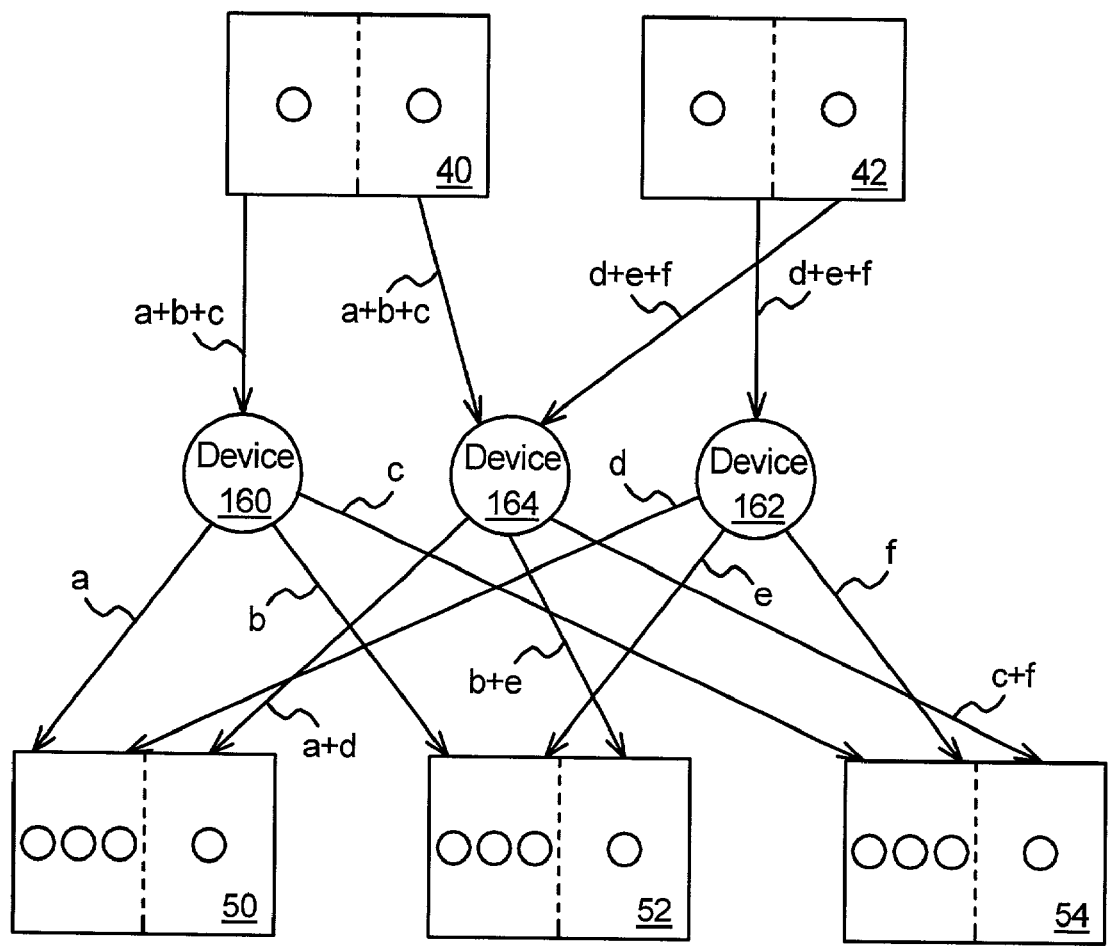
FIG. 12 shows primary and backup interconnect fabrics for the example design according to an embodiment of the present invention.

Both the primary interconnect fabric and the backup interconnect fabric are implemented together in the network. FIG. 12 shows the primary and backup interconnect fabrics of the example implemented together in the network. As shown in FIG. 12, the primary interconnect fabric connects the first set of ports of each node while the backup interconnect fabric connects the second set of ports of each node.

Figure 13:
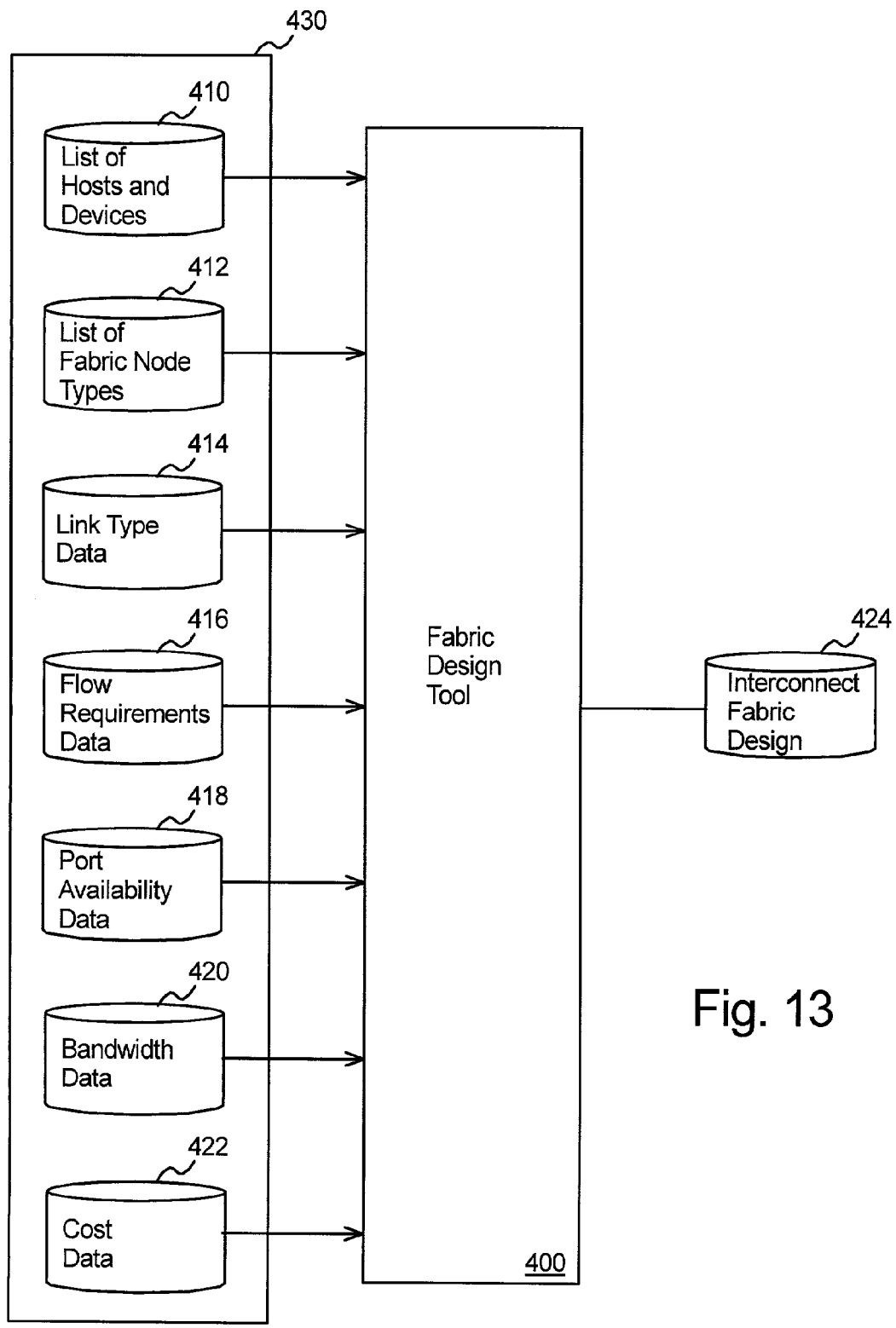
FIG. 13 shows a fabric design tool that may employ techniques of the present invention to provide reliability to an interconnect fabric design.

FIG. 13 shows a system having a fabric design tool 400 that may employ the method 100 (and the methods 200 and 300) to provide reliability to an interconnect fabric in response to a set of design information 430. The fabric design tool 400 may be implemented in software and/or hardware to perform its functions. The design information 430 in one embodiment includes a list of hosts (source nodes) and devices (terminal nodes) 410, a list of fabric node types 412, a list of link type data 414, a set of flow requirements data 416, a set of port availability data 418, a set of bandwidth data 420, and a set of cost data 422. The design information 430 may be implemented as an information store, such as a file or set of files or a database, etc.

The list of hosts and devices 410 may specify the hosts and devices which are to be interconnected by an interconnect fabric design 424.

The list of fabric node types 412 may specify available interconnect devices, such as hubs, routers, switches, etc.

The link type data 414 may specify a list of available communication links that may be employed in the interconnect fabric design 424 and any relevant constraints. There are numerous examples of available communication links including fiber optic links, fiber channel links, wire-based links, and links such as SCSI as well as wireless links.

The flow requirements data 416 may specify the desired flow requirements for the interconnect fabric design 422. The desired flow requirements may include bandwidth requirements for each pairing of the source and terminal nodes.

The port availability data 418 may specify the number of communication ports available on each source node and each terminal node and each available interconnect device.

The bandwidth data 420 may specify the bandwidth of each host and device port and each type of fabric node and link.

The cost data 422 may specify costs associated with the available communication links and interconnect devices that may be employed in the interconnect fabric design 424. The cost data 422 may also specify the costs of ports for source and terminal nodes and interconnect devices. Other relevant costs may also be indicated.

The interconnect fabric design 424 generated by the fabric design tool 100 includes a list of the physical communication links and interconnect devices and ports, etc. and may include cost data.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method of providing reliability to an interconnect fabric for communication among a set of nodes, the method comprising:
    partitioning ports associated with each node into a first set of ports and a second set of ports;
    forming a primary interconnect fabric among the first set of ports in response to a set of flow requirements; and
    forming a backup interconnect fabric among the second set of ports wherein the backup interconnect fabric carries a portion of communications carried by the primary fabric so as to protect against occurrence of a failure in the primary fabric, said forming the backup interconnect fabric comprising determining feasibility of merging candidate flow sets based on a sum of flow requirements in the candidate flow sets that are interrupted by a single failure in the primary interconnect fabric.

2. The method according to claim 1, wherein said forming the backup interconnect fabric further comprises generating arrangements of flow sets in response to the flow requirements, determining feasibility of merging pairs of candidate flow sets and merging a pair of the flow sets.

3. The method according to claim 2, wherein said merging the pair of the flow sets alleviates at least one port violation with respect to the second set of ports.

4. The method according to claim 1, said partitioning further comprising partitioning the ports associated with each node into a number of additional sets of ports.

5. The method according to claim 4, further comprising forming additional interconnect fabrics among the additional sets of ports.

6. The method according to claim 1, said partitioning further comprising partitioning the ports associated with each node into a number of additional sets of ports.

7. The method according to claim 6, further comprising forming additional interconnect fabrics among the additional sets of ports.

8. The method according to claim 1, wherein said set of nodes includes source nodes and terminal nodes.

9. The method according to claim 1, wherein each node is associated with at least two ports.

10. The method according to claim 1, wherein the second set of ports includes one port for each node.

11. A method of providing reliability to an interconnect fabric for communication among a set of nodes, the method comprising:
    partitioning ports associated with each node into a first set of ports and a second set of ports;
    forming a primary interconnect fabric among the first set of ports in response to a set of flow requirements; and
    forming a backup interconnect fabric among the second set of ports wherein the backup interconnect fabric carries a portion of communications carried by the primary fabric so as to protect against occurrence of a failure in the primary fabric, wherein said forming the backup interconnect fabric comprises determining feasibility based on a highest sum of flow requirements in the candidate flow sets tat are interrupted by different failures in the primary interconnect fabric.

12. The method according to claim 11, wherein said forming the backup interconnect fabric further comprises generating arrangements of flow sets in response to the flow requirements, determining feasibility of merging pairs of candidate flow sets and merging a pair of the flow sets.

13. The method according to claim 12, wherein said merging the pair of the flow sets alleviates at least one port violation with respect to the second set of ports.

14. The method according to claim 11, wherein said set of nodes includes source nodes and terminal nodes.

15. The method according to claim 11, wherein each node is associated with at least two ports.

16. The method according to claim 11, wherein the second set of ports includes one port for each node.

17. A method of providing reliability to an interconnect fabric for communication among a set of nodes, the method comprising:
    identifying one or more failure modes in a primary interconnect fabric, wherein the primary interconnect fabric carries communications among the set of nodes via a first set of ports of the nodes; and
    forming a backup interconnect fabric among a second set of ports of the nodes for carrying a portion of the communications of the primary fabric so as to protect against occurrence of any single one of the failure modes of the primary fabric, wherein said forming the backup interconnect fabric comprises determining feasibility of merging candidate flow sets based on a sum of flow requirements in the candidate flow sets in the primary interconnect fabric that are interrupted by occurrence of a single failure mode in the primary interconnect fabric.

18. The method according to claim 17, wherein said forming the backup interconnect fabric comprises generating arrangements of flow sets in response to the flow requirements, determining feasibility of merging pairs of candidate flow sets and merging a pair of the flow sets.

19. The method according to claim 18, wherein said merging the pair of the flow sets alleviates at least one port violation with respect to the second set of ports.

20. The method according to claim 17, said partitioning further comprising partitioning the ports associated with each node into a number of additional sets of ports.

21. The method according to claim 20, further comprising forming additional interconnect fabrics among the additional sets of ports.

22. The method according to claim 17, wherein said set of nodes includes source nodes and terminal nodes.

23. The method according to claim 17, wherein each node is associated with at least two ports.

24. The method according to claim 17, wherein the second set of ports includes one port for each node.

25. A method of providing reliability to an interconnect fabric for communication among a set of nodes, the method comprising:
   identifying one or more failure modes in a primary interconnect fabric, wherein the primary interconnect fabric carries communications among the set of nodes via a first set of ports of the nodes; and
   forming a backup interconnect fabric among a second set of ports of the nodes carrying a portion of the communications of the primary fabric so as to protect against occurrence of any single one of the failure modes of the primary fabric, wherein said forming the backup interconnect fabric comprises determining feasibility of merging candidate flow sets based on a highest sum of flow requirements in the candidate flow sets in the primary interconnect fabric that are interrupted by occurrence of different failure modes in the primary interconnect fabric.

26. The method according to claim 25, wherein said forming the backup interconnect fabric comprises generating arrangements of flow sets in response to the flow requirements, determining feasibility of merging pairs of candidate flow sets and merging a pair of the flow sets.

27. The method according to claim 26, wherein said merging the pair of the flow sets alleviates at least one port violation with respect to the second set of ports.

28. The method according to claim 25, wherein said set of nodes includes source nodes and terminal nodes.

29. The method according to claim 25, wherein each node is associated with at least two ports.

30. The method according to claim 25, said partitioning further comprising partitioning the ports associated with each node into a number of additional sets of ports.

31. The method according to claim 30, further comprising forming additional interconnect fabrics among the additional sets of ports.

32. The method according to claim 25, wherein the second set of ports includes one port for each node.

33. A system for generating an interconnect fabric design comprising:
   means for partitioning ports associated with each node into a first set of ports and a second set of ports;
   means for generating a design for a primary interconnect fabric among the first set of ports in response to a set of flow requirements; and
   means for generating a design for a backup interconnect fabric among the second set of ports wherein the backup interconnect fabric carries a portion of communications carried by the primary interconnect fabric so as to protect against occurrence of a failure in the primary interconnect fabric, wherein the means for generating the design for the backup interconnect fabric determines feasibility of merging candidate flow sets based on a sum of flow requirements in the candidate flow sets that are interrupted by a single failure in the primary interconnect fabric.

34. A system for generating an interconnect fabric design comprising:
   means for partitioning ports associated with each node into a first set of ports and a second set of ports;
   means for generating a design for a primary interconnect fabric among the first set of ports in response to a set of flow requirements; and
   means for generating a design for a backup interconnect fabric among the second set of ports wherein the backup interconnect fabric carries a portion of communications carried by the primary interconnect fabric so as to protect against occurrence of a failure in the primary interconnect fabric, wherein the means for generating the design for the backup interconnect fabric determines feasibility based on a highest sum of flow requirements in the candidate flow sets that are interrupted by different failures in the primary interconnect fabric.

35. A system for generating an interconnect fabric design comprising:
   means for identifying one or more failure modes in a primary interconnect fabric, wherein the primary interconnect fabric carries communications among the set of nodes via a first set of ports of the nodes; and
   means for generating a design for a backup interconnect fabric among a second set of ports of the nodes for carrying a portion of the communications of the primary interconnect fabric so as to protect against occurrence of any single one of the failure modes of the primary interconnect fabric, wherein the means for generating the design for the backup interconnect fabric determines feasibility of merging candidate flow sets based on a sum of flow requirements in the candidate flow sets in the primary interconnect fabric that are interrupted by occurrence of a single failure mode in the primary interconnect fabric.

36. A system for generating an interconnect fabric design comprising:
   means for identifying one or more failure modes in a primary interconnect fabric, wherein the primary interconnect fabric carries communications among the set of nodes via a first set of ports of the nodes; and
   means for generating a design for a backup interconnect fabric among a second set of ports of the nodes for carrying a portion of the communications of the primary interconnect fabric so as to protect against occurrence of any single one of the failure modes of the primary interconnect fabric, wherein the means for generating the design for the backup interconnect fabric determines feasibility of merging candidate flow sets based on a highest sum of flow requirements in the candidate flow sets in the primary interconnect fabric that are interrupted by occurrence of different failure modes in the primary interconnect fabric.

* * * * *

UNITED STATES PATENT AND TRADEMARK OFFICE
CERTIFICATE OF CORRECTION

PATENT NO. : 7,233,983 B2  Page 1 of 1
APPLICATION NO. : 10/052682
DATED : June 19, 2007
INVENTOR(S) : Julie Ann Ward et al.

It is certified that error appears in the above-identified patent and that said Letters Patent is hereby corrected as shown below:

In column 11, line 56, in Claim 6, delete "claim 1" and insert -- claim 11 --, therefor.

In column 12, line 15, in Claim 11, after "sets" delete "tat" and insert -- that --, therefor.

In column 13, line 11, in Claim 25, after "nodes" insert -- for --.

Signed and Sealed this

Thirteenth Day of April, 2010

David J. Kappos
*Director of the United States Patent and Trademark Office*